July 10, 1951 A. J. GUILLEMETTE 2,560,101
VEHICLE TIRE SPREADER
Filed Dec. 31, 1948
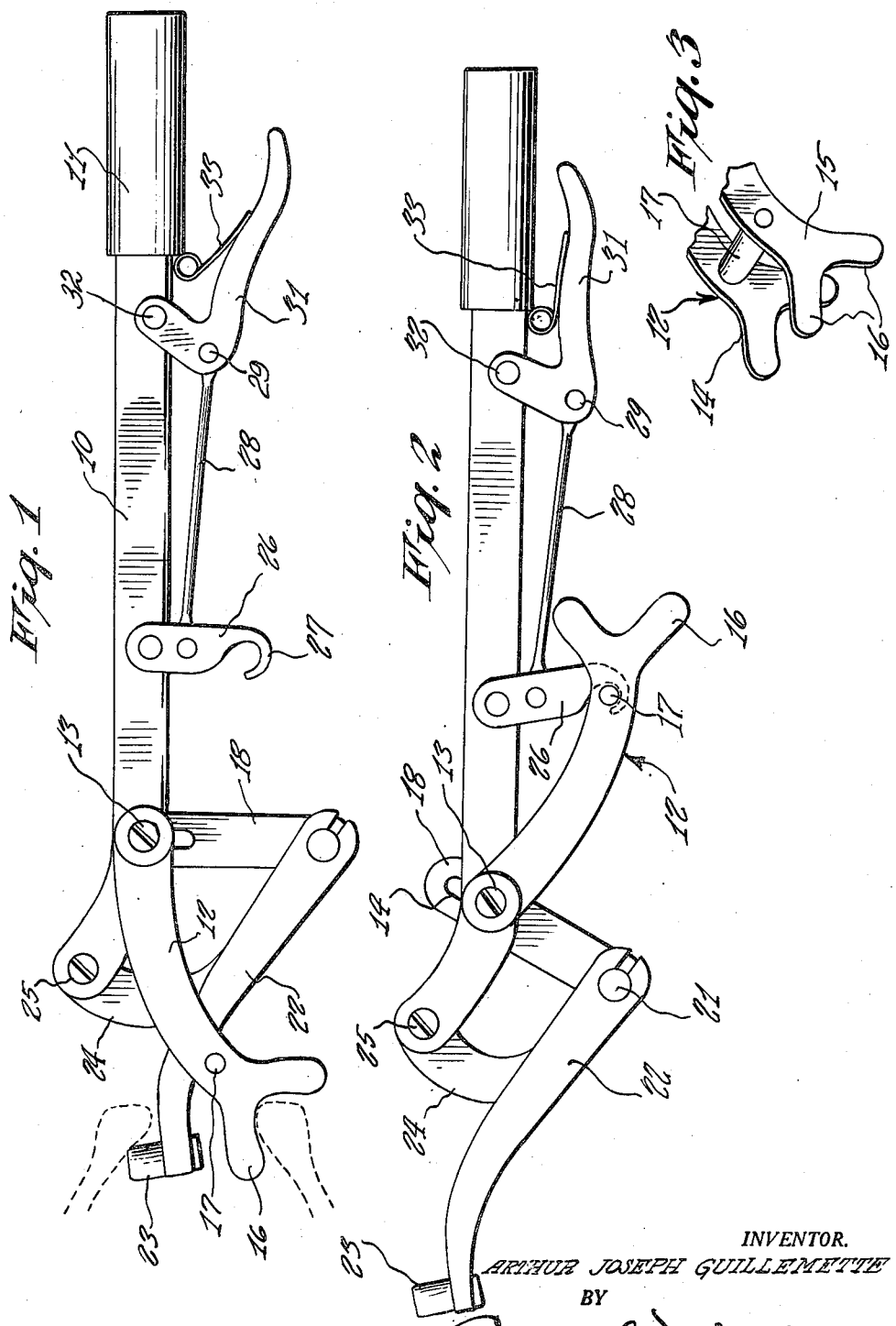
INVENTOR.
ARTHUR JOSEPH GUILLEMETTE
BY
Carl Miller
ATTORNEY

Patented July 10, 1951

2,560,101

UNITED STATES PATENT OFFICE 2,560,101

VEHICLE TIRE SPREADER

Arthur Joseph Guillemette, Washington, R. I.

Application December 31, 1948, Serial No. 68,531

3 Claims. (Cl. 254—50.1)

This invention relates to a vehicle tire spreader.

It is an object of the present invention to provide a tire spreader tool adapted for use in small garage and filling stations where there is not room for the heavier and more expensive equipment for spreading tires.

Other objects of the present invention are to provide a hand tire spreader tool which is of simple construction, easy to operate, inexpensive to manufacture, has a minimum number of parts, can be locked in its open position, and efficient in operation.

For other objects and for a better understanding of the invention, reference may be had to the following detailed description taken in connection with the accompanying drawing, in which Fig. 1 is a side elevational view of the tire spreader with the parts collapsed so that they may be extended into the closed tire.

Fig. 2 is a side elevational view of a tire spreader with the parts extended as when the tire has been spread.

Fig. 3 is a fragmentary perspective view of one of the gripping elements.

Referring now to the figures, 10 represents a lever arm having a handle 11. Pivotally connected to the lever arm is a dual arm structure 12. This arm is pivoted by a screw, as indicated at 13. Arm structure 12 has laterally spaced arms 14 and 15 having prongs 16 thereon adapted to engage with the tire bead. These arms are held in spaced relationship by a roller 17.

Also secured by the same screw 13 to the lever arm 10 is a slotted link 18 having slot 19 to allow the link to be adjusted axially as well as pivotally about the screw 13.

Pivotally connected to the lower end of the link of lever 18 as at 21 is a bead engaging element 22 having a stud or bead engaging element 23 for engagement with the opposite tire bead. This element 22 has a fixed arm 24 which is pivotally connected to the lever arm 10 by a screw 25. The roller 17 prevents the reverse separation of the bead engaging element 23 and the arm structure 12, Fig. 1.

On the lever arm 10 is a latch 26 having a hook portion 27 thereon adapted to receive roller 17 as the dual arm structure 12 is spread to the full extent. This latch will thus hold the tire in a spread condition. A link 28 is pivotally connected at 29 to an operating lever 31 pivotally connected at 32 to the lever arm. A spring 33 urges the operating lever 31 outwardly and the hook portion of the latch lever 26 toward and secure upon the roller 17 of the arm structure 12.

To operate the device, a tire is held upright with one hand and with the other hand the tool is picked up by the lever handle. Prongs 16 of the arm structure 12 are inserted in the tire bead at one side while the stud 23 of the element 22 is inserted onto the tire bead at the other side and a downward pressure is exerted until the roller 17 contacts the lock hook 27. The hook 27 is maintained against the roller until released by the depressing of operating lever 31. After the inside of the tire has been inspected for breaks, nails and so forth, and has been repaired, a slight squeeze of the operating lever 31 will release the dual arm structure 12 and the tool from the tire.

While various changes may be made in the detail construction, it shall be understood that such changes shall be within the spirit and scope of the present invention as defined by the appended claims.

Having thus set forth and disclosed the nature of my invention, what is claimed is:

1. A vehicle tire spreading device comprising a lever arm having a handle portion, an arm structure pivotally connected to the lever arm and having a prong thereon adapted to engage with a tire bead, a slotted link pivotally connected to the lever arm adjacent the connection of the arm structure thereto, a bead engaging element pivotally connected to the link and also pivotally connected to the lever arm, said arm structure and bead engaging element being separable from one another upon pivoting the lever arm to spread the tire and being collapsible one upon the other upon release of the lever action.

2. A vehicle tire spreading device comprising a lever arm having a handle portion, an arm structure pivotally connected to the lever arm and having a prong thereon adapted to engage with a tire bead, a slotted link pivotally connected to the lever arm adjacent the connection of the arm structure thereto, a bead engaging element pivotally connected to the link and also pivotally connected to the lever arm, said arm structure and bead engaging element being separable from one another upon pivoting the lever arm to spread the tire and being collapsible one upon the other upon release of the lever action, and said arm structure having a roller engageable with the bead engaging element, the arm structure and bead engaging element being collapsed to prevent the reverse separation of the arm structure and bead engaging element.

3. A vehicle tire spreading device comprising a lever arm having a handle portion, an arm structure pivotally connected to the lever arm and having a prong thereon adapted to engage with a tire bead, a slotted link pivotally connected to the lever arm adjacent the connection of the arm structure thereto, a bead engaging element pivotally connected to the link and also pivotally connected to the lever arm, said arm structure and bead engaging element being separable from one another upon pivoting the lever arm to spread the tire and being collapsible one upon the other upon release of the lever action, and said arm structure having a roller engageable with the bead engaging element, the arm structure and bead engaging element being collapsed to prevent the reverse separation of the arm structure and bead engaging element, and a latch lever pivoted upon the lever arm and having a hook formation adapted to engage with the roller upon the arm structure being separated from the bead engaging element, and linkage extending from the latch lever and connected to the lever arm adjacent the handle for operating the catch lever to release the arm structure.

ARTHUR JOSEPH GUILLEMETTE.

REFERENCES CITED

The following references are of record in the file of this patent:

UNITED STATES PATENTS

| Number | Name | Date |
|---|---|---|
| 1,535,192 | Wilbur | Apr. 28, 1925 |

FOREIGN PATENTS

| Number | Name | Date |
|---|---|---|
| 622,964 | France | Mar. 8, 1927 |